(12) United States Patent
Ashbrook et al.

(10) Patent No.: US 9,339,726 B2
(45) Date of Patent: May 17, 2016

(54) METHOD AND APPARATUS FOR MODIFYING THE PRESENTATION OF INFORMATION BASED ON THE VISUAL COMPLEXITY OF ENVIRONMENT INFORMATION

(75) Inventors: Daniel L. Ashbrook, Sunnyvale, CA (US); David H. Nguyen, Sunnyvale, CA (US)

(73) Assignee: Nokia Technologies Oy, Espoo (FI)

(*) Notice: Subject to any disclaimer, the term of this patent is extended or adjusted under 35 U.S.C. 154(b) by 174 days.

(21) Appl. No.: 13/538,358

(22) Filed: Jun. 29, 2012

(65) Prior Publication Data
US 2014/0002474 A1     Jan. 2, 2014

(51) Int. Cl.
| | | |
|---|---|---|
| *A63F 13/40* | (2014.01) | |
| *G06T 11/60* | (2006.01) | |
| *G06T 19/00* | (2011.01) | |
| *G06T 19/20* | (2011.01) | |

(52) U.S. Cl.
CPC .................. *A63F 13/10* (2013.01); *G06T 11/60* (2013.01); *G06T 19/006* (2013.01); *G06T 19/20* (2013.01); *A63F 2300/1093* (2013.01); *A63F 2300/69* (2013.01)

(58) Field of Classification Search
CPC .......... G09G 5/00; G09G 5/02; G06T 19/006; G02B 27/01
USPC ....................................... 345/589, 619, 8, 633
See application file for complete search history.

(56) References Cited

U.S. PATENT DOCUMENTS

| | | |
|---|---|---|
| 7,130,664 B1 | 10/2006 | Williams |
| 7,792,552 B2 | 9/2010 | Thomas et al. |
| 7,840,032 B2 * | 11/2010 | Ofek ............................. 382/113 |
| 7,890,324 B2 * | 2/2011 | Bangalore et al. ............ 704/231 |
| 8,188,846 B2 * | 5/2012 | Cooper et al. ............. 340/425.5 |
| 8,427,395 B2 * | 4/2013 | Seder et al. ........................ 345/7 |
| 8,542,108 B1 * | 9/2013 | Izdepski et al. ............... 340/461 |
| 2004/0210847 A1 * | 10/2004 | Berson et al. .................. 715/788 |
| 2004/0266348 A1 | 12/2004 | Deshpande et al. |

(Continued)

FOREIGN PATENT DOCUMENTS

| | | |
|---|---|---|
| AU | 2011/204946 | 12/2011 |
| JP | H09-101477 A | 4/1997 |

(Continued)

OTHER PUBLICATIONS

Gepner, D., et al.; "Gaze a Supplementary Modality for Interacting with Ambient Intelligence Environments"; [Online]; [Retrieved on Jul. 24, 2012]; Retrieved from the Internet <URL:http://arxiv.org/ftp/arxiv/papers/0708/0708.3505.pdf>.

(Continued)

*Primary Examiner* — Maurice L McDowell, Jr.
(74) *Attorney, Agent, or Firm* — Alston & Bird LLP

(57) ABSTRACT

Methods, apparatuses, and computer program products are herein provided for modifying the presentation of information based on the visual complexity of environment information. A method may include causing presentation of information on a display. The method may further include determining a visual complexity level of environment information. The method may further include causing, based at least in part on the determined visual complexity level, modification of presentation of at least a portion of the information on the display. Corresponding apparatuses and computer program products are also provided.

18 Claims, 18 Drawing Sheets

(56) References Cited

U.S. PATENT DOCUMENTS

| | | | |
|---|---|---|---|
| 2005/0071082 A1* | 3/2005 | Ohmura et al. | 701/211 |
| 2005/0171746 A1* | 8/2005 | Thalhammer-Reyero | 703/2 |
| 2007/0087790 A1 | 4/2007 | Worick et al. | |
| 2008/0293453 A1 | 11/2008 | Atlas et al. | |
| 2009/0028179 A1 | 1/2009 | Albal | |
| 2010/0179717 A1* | 7/2010 | Gilbert | 701/29 |
| 2010/0201709 A1* | 8/2010 | Yang et al. | 345/629 |
| 2010/0253602 A1* | 10/2010 | Szczerba et al. | 345/8 |
| 2010/0283969 A1* | 11/2010 | Cooperstock et al. | 351/201 |
| 2011/0018903 A1 | 1/2011 | Lapstun et al. | |
| 2011/0158478 A1 | 6/2011 | Yamada et al. | |
| 2011/0270135 A1* | 11/2011 | Dooley et al. | 600/595 |
| 2011/0287811 A1 | 11/2011 | Mattila et al. | |
| 2012/0001938 A1* | 1/2012 | Sandberg | 345/633 |
| 2012/0036433 A1* | 2/2012 | Zimmer et al. | 715/702 |
| 2012/0120186 A1* | 5/2012 | Diaz et al. | 348/36 |
| 2013/0076787 A1* | 3/2013 | Mathieu et al. | 345/633 |
| 2013/0141460 A1* | 6/2013 | Kane-Esrig et al. | 345/633 |
| 2013/0147837 A1* | 6/2013 | Stroila | 345/633 |
| 2014/0002486 A1* | 1/2014 | Ratcliff et al. | 345/629 |

FOREIGN PATENT DOCUMENTS

| | | |
|---|---|---|
| JP | H10-292807 A | 11/1998 |
| JP | 2005-044102 A | 2/2005 |
| JP | 2005-208159 A | 8/2005 |
| JP | 2010-067083 A | 3/2010 |
| JP | 2011-123807 A | 6/2011 |
| WO | WO 2012/112092 A1 | 8/2012 |

OTHER PUBLICATIONS

Rolland, J., et al., "High-resolution inset head-mounted display"; [Online]; [Retrieved on Jul. 24, 2012]; Retrieved from the Internet <URL: http://www.cs.duke.edu/~reif/paper/yoshida/hmd/pubhmd.pdf>.

Turner, J., et al.; "*Extending the Visual Field of a Head-mounted Eye Tracker for Pervasive Eye-based Interaction*", ACM (2012), 269-272; [Online]; [Retrieved on Jul. 24, 2012].

Doshi, A., et al.; "Head and Eye Gaze Dynamics During Visual Attention Shifts in Complex Environments"; [Online]; [Retrieved on Jul. 24, 2012]; Retrieved from the Internet <URL:http://journalofvision.org/content/12/2/9.full>.

Invitation to Pay Additional Fees for Application No. PCT/FI2013/050626 dated Oct. 1, 2013.

Gabbard, J. L. et al., *Active Text Drawing Styles for Outdoor Augmented Reality: A User-Based Study and Design Implications*, IEEE Virtual Reality Conference 2007, Mar. 10-14, 2007, Charlotte, North Carolina, pp. 35-42.

Kalkofen, D. et al., *Interactive Focus and Context Visualization for Augmented Reality*, Mixed and Augmented reality, 2007, ISMAR 2007, 6th IEEE and ACM International Symposium, Nov. 13, 2007, 10 pages.

Rosten, E. et al., *Real-Time Video Annotation for Augmented Reality*, Advances in Visual Computing Lecture Notes in Computer Science; LNCS, Springer, Berlin, DE, Jan. 1, 2005, pp. 294-302.

Tanaka, K. et al.,*An Information Layout Method for an Optical See-through Head Mounted Display Focusing on the Viewability* , Mixed and Augmented Reality, 2008. ISMAR 2008. 7th IEEE/ACM International Symposium, Sep. 15, 2008, pp. 139-142.

International Search Report and Written Opinion from International Application No. PCT/FI2013/050626, dated Jan. 15, 2014.

"Phone Call Notification by Bluetooth Vibrating Bracelet" [online] [retrieved Dec. 11, 2014]. Retrieved from the Internet: http://geniusbeauty.com/tech-gadgets-women/phone-call-notification-bluetooth-vibrating-bracelet/. Dated Apr. 10, 2009; 2 pages.

Office Action from corresponding Korean Patent Application No. 2014-7036209, dated Dec. 18, 2015.

Office Action from corresponding Japanese Patent Application No. 2015-519261, dated Feb. 8, 2016.

\* cited by examiner

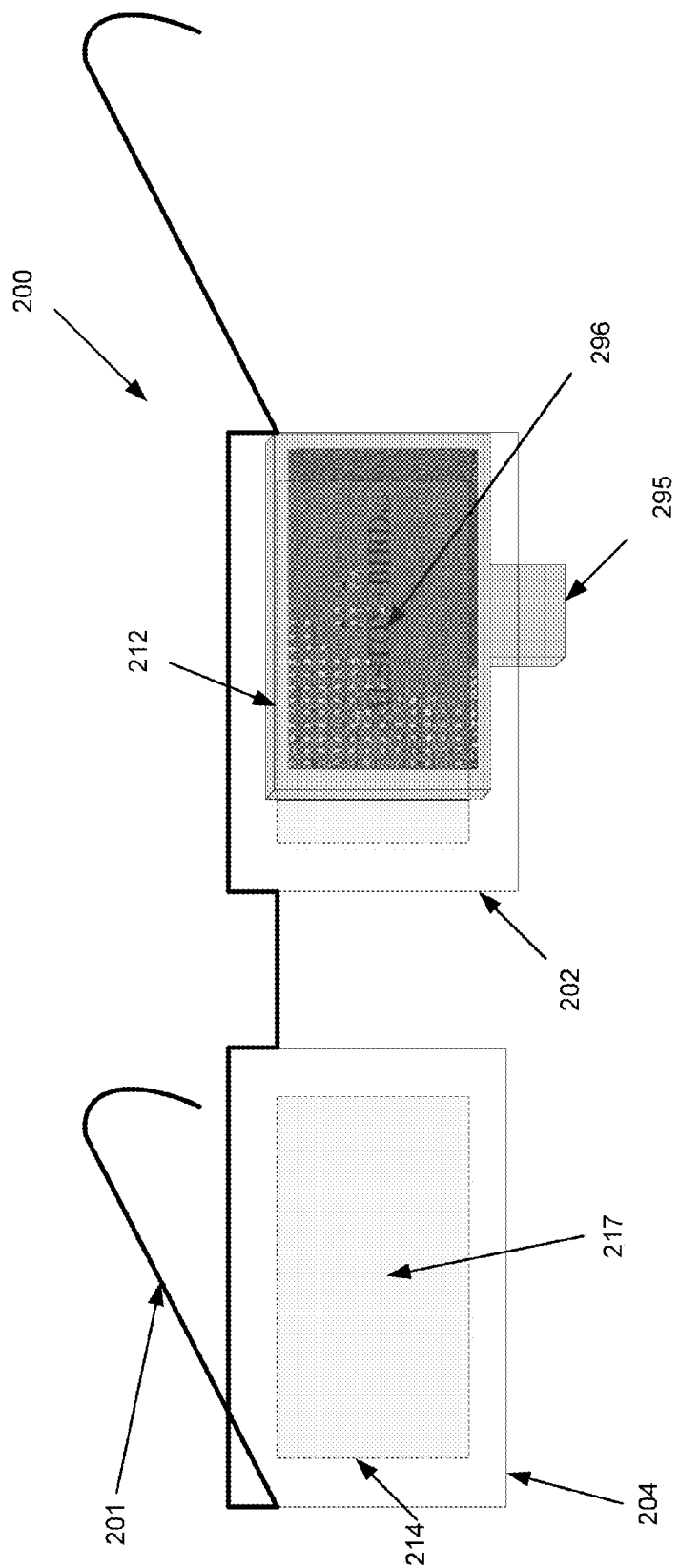

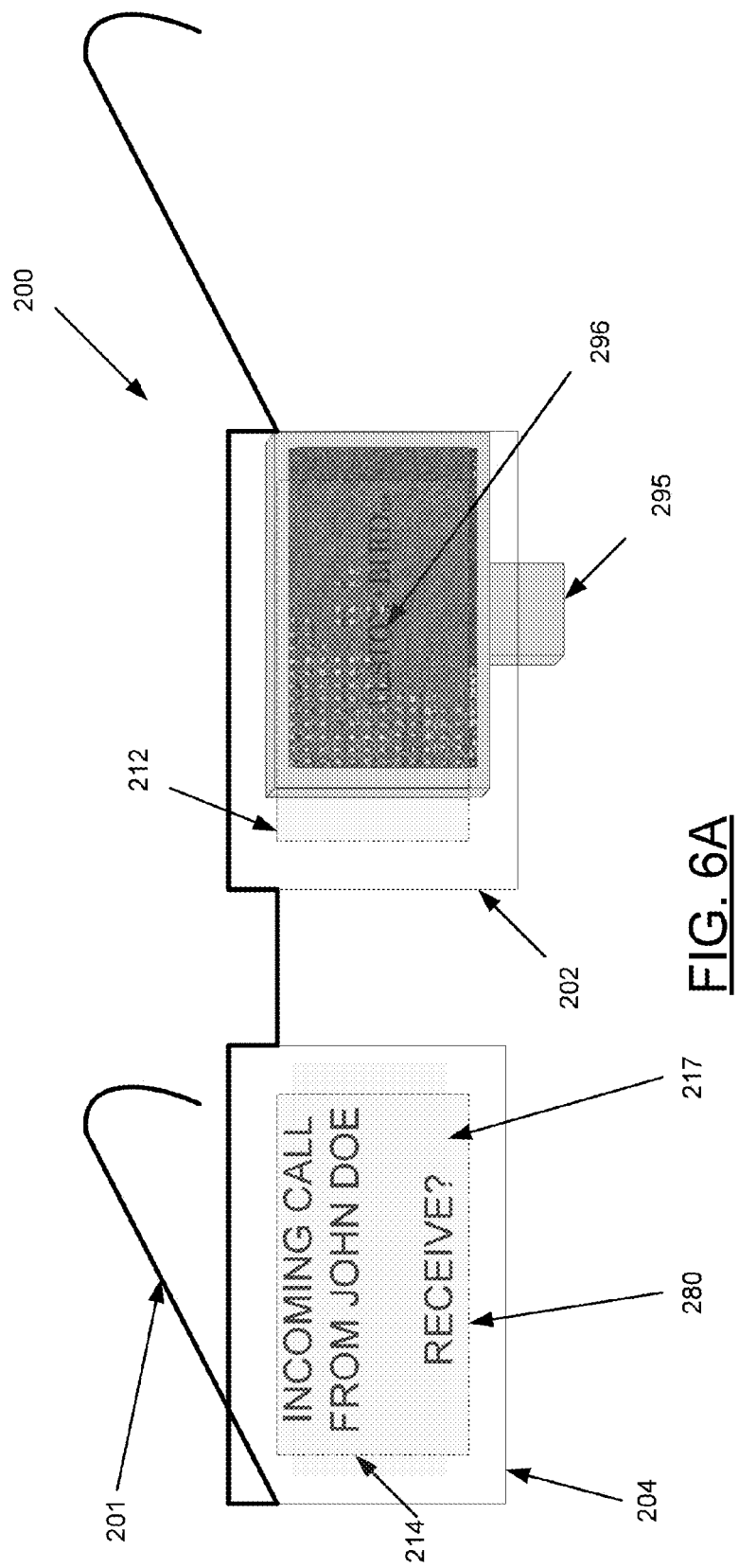

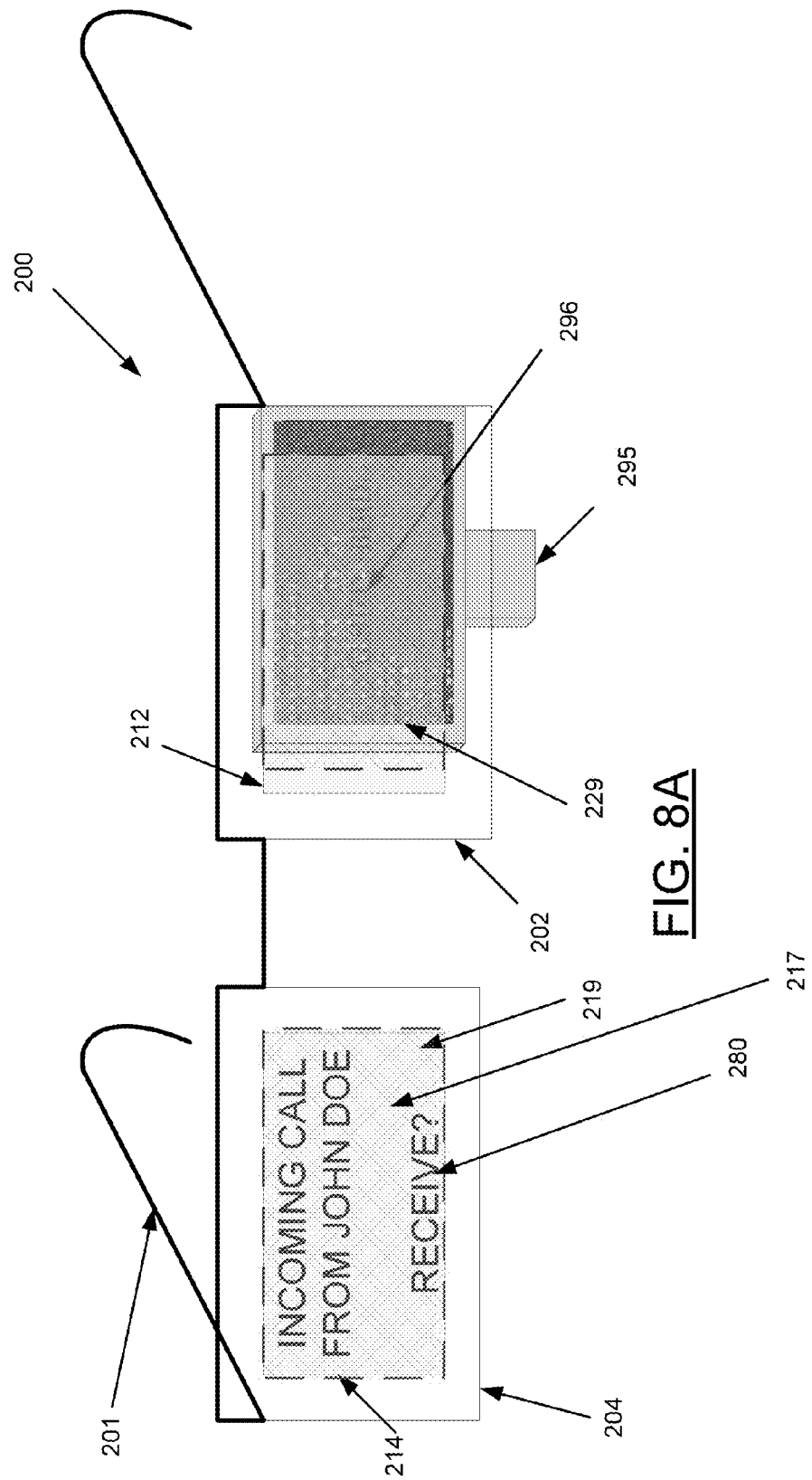

METHOD AND APPARATUS FOR MODIFYING THE PRESENTATION OF INFORMATION BASED ON THE VISUAL COMPLEXITY OF ENVIRONMENT INFORMATION

TECHNOLOGICAL FIELD

Example embodiments of the present invention relate generally to user interface technology and, more particularly, relate to methods, apparatuses, and computer program products for modifying the presentation of information based on the visual complexity of environment information.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

BRIEF SUMMARY

Embodiments of the present invention provide methods, apparatuses, and computer program products for modifying the presentation of information based on the visual complexity of environment information. In one example embodiment, a method includes causing presentation of information on a display. The method further includes determining a visual complexity level of environment information. The method further includes causing, based at least in part on the determined visual complexity level, modification of presentation of at least a portion of the information on the display.

In some embodiments, the method may further include causing modification of presentation of the at least a portion of the information by causing presentation of the at least a portion of the information to become less complex in an instance in which the determined visual complexity level of the environment information is greater than a pre-determined visual complexity level. In some embodiments, the method may further include causing presentation of the at least a portion of the information to become less complex by causing at least a portion of the information being presented to be removed.

In some embodiments, the method may further include causing modification of presentation of the at least a portion of the information by causing a modification to the at least a portion of the information in at least one of: size, color, or brightness.

In some embodiments, the method may further include determining the visual complexity level by determining the visual complexity level based at least in part on output provided by at least one of: a gaze tracker or a front-facing camera.

In some embodiments, the display may define a plurality of portions that each correspond to different environment information. The method may further include determining the visual complexity level by determining the visual complexity level for environment information that corresponds to at least one portion of the display. Additionally, the method may further include causing modification of presentation of the at least a portion of the information by causing modification of presentation of the at least a portion of the information that corresponds to the at least one portion of the display. Additionally, in some embodiments, the method may further include causing presentation of the at least a portion of the information that is modified to affix to the environment information from the perspective of the user such that the at least a portion of the information remains presented over the environment information from the perspective of the user independent of the movement of the display relative to the environment information.

In another example embodiment, an apparatus includes at least one processor and at least one memory storing computer program code, wherein the at least one memory and stored computer program code are configured, with the at least one processor, to cause the apparatus to cause presentation of information on a display. The at least one memory and stored computer program code are configured, with the at least one processor, to further cause the apparatus to determine a visual complexity level of environment information. The at least one memory and stored computer program code are configured, with the at least one processor, to further cause the apparatus to cause, based at least in part on the determined visual complexity level, modification of presentation of at least a portion of the information on the display.

In another example embodiment, a computer program product is provided. The computer program product of this example embodiment includes at least one computer-readable storage medium having computer-readable program instructions stored therein. The program instructions of this example embodiment comprises program instructions configured to cause an apparatus to perform a method including causing presentation of information on a display. The method further includes determining a visual complexity level of environment information. The method further includes causing, based at least in part on the determined visual complexity level, modification of presentation of at least a portion of the information on the display.

In another example embodiment, an apparatus is provided. The apparatus comprises means for causing presentation of information on a display. The apparatus further includes means for determining a visual complexity level of environment information. The apparatus further includes means for causing, based at least in part on the determined visual complexity level, modification of presentation of at least a portion of the information on the display.

BRIEF DESCRIPTION OF THE DRAWINGS

Figure 1:
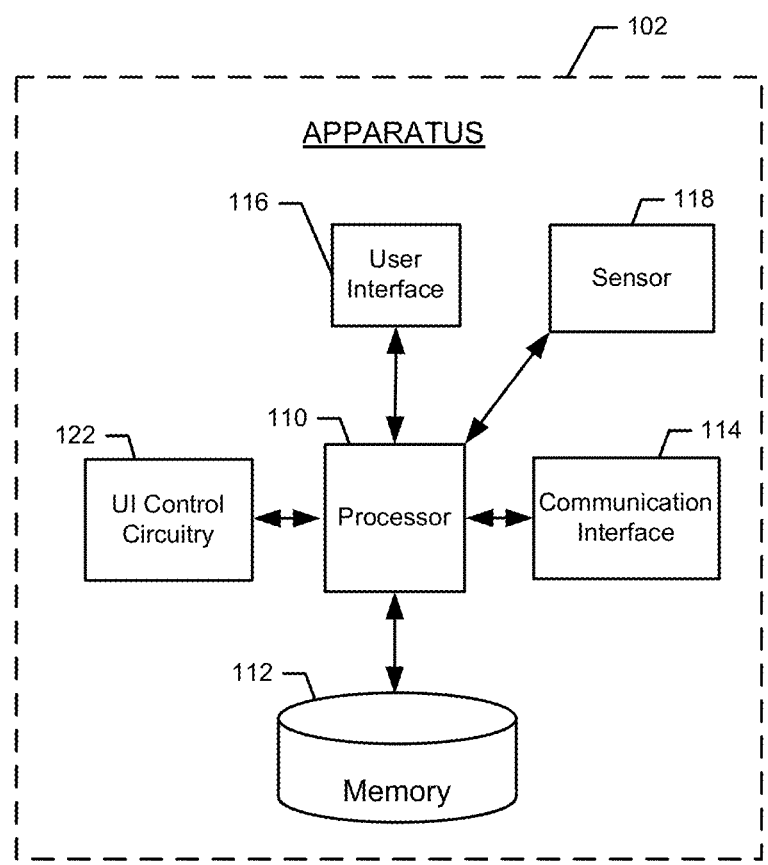
Figure 2:
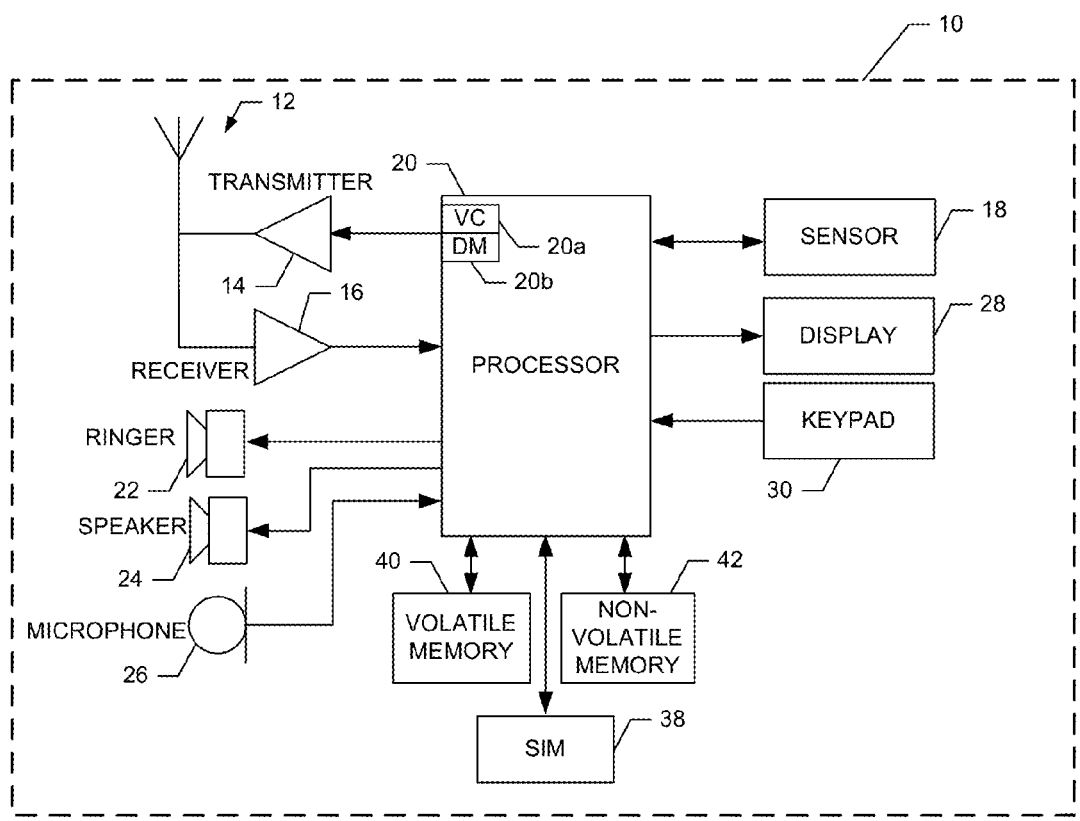
Figure 3A:
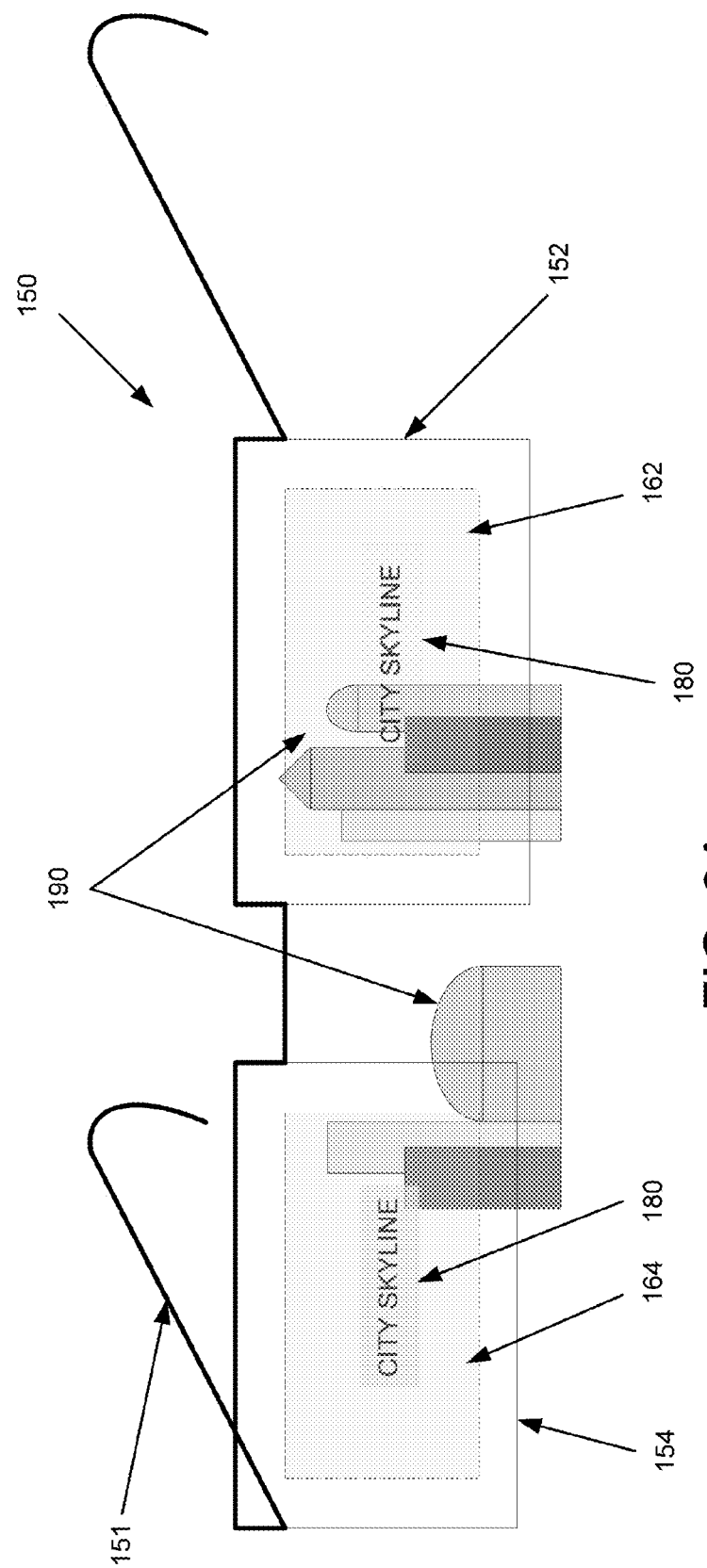
Figure 3B:
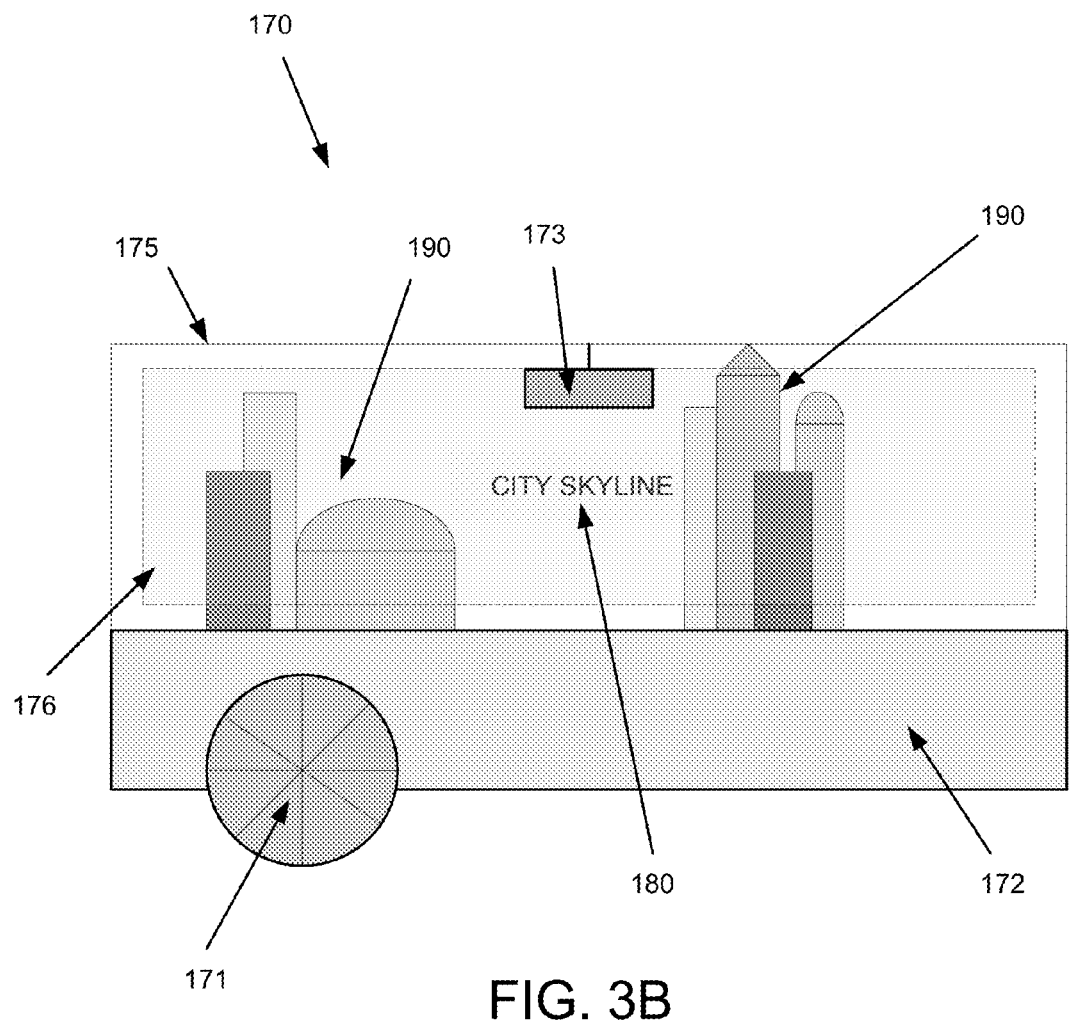
Figure 4A:
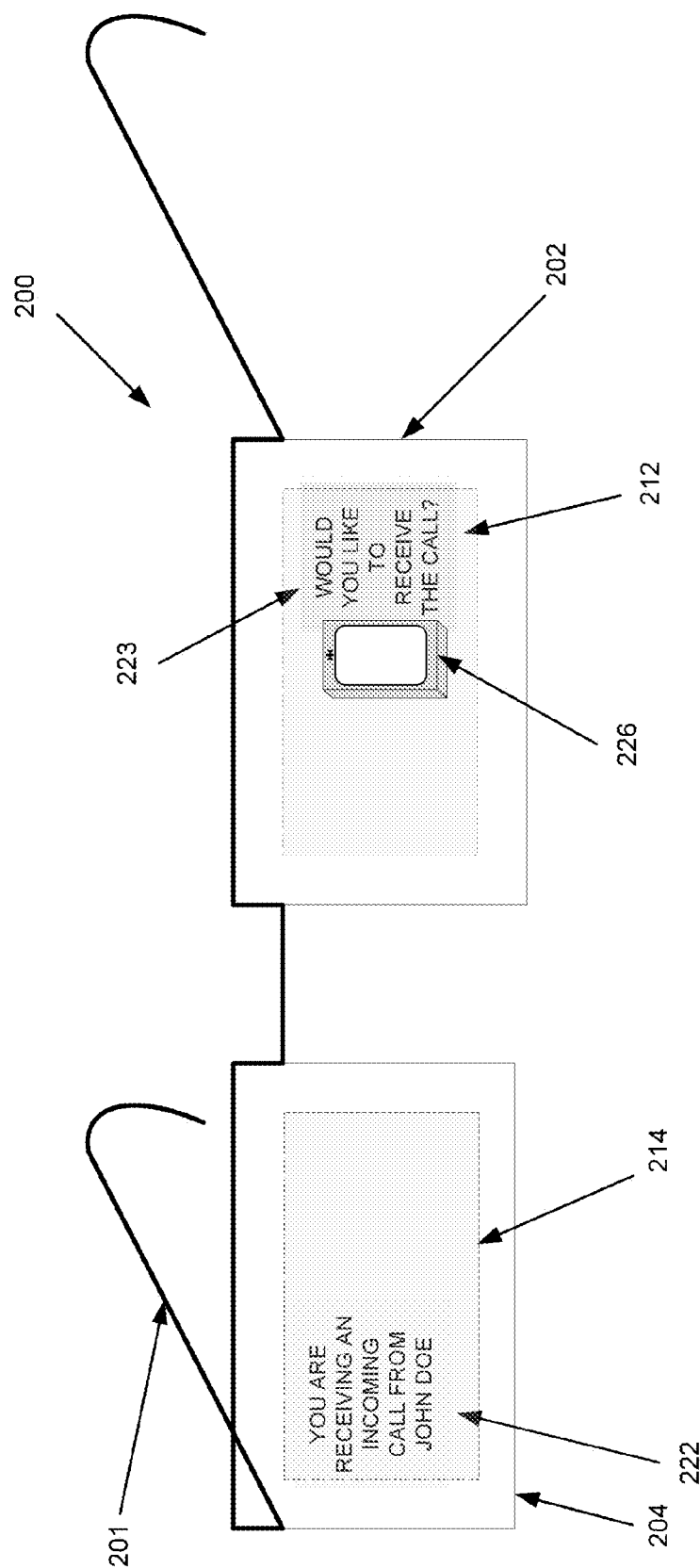
Figure 4B:
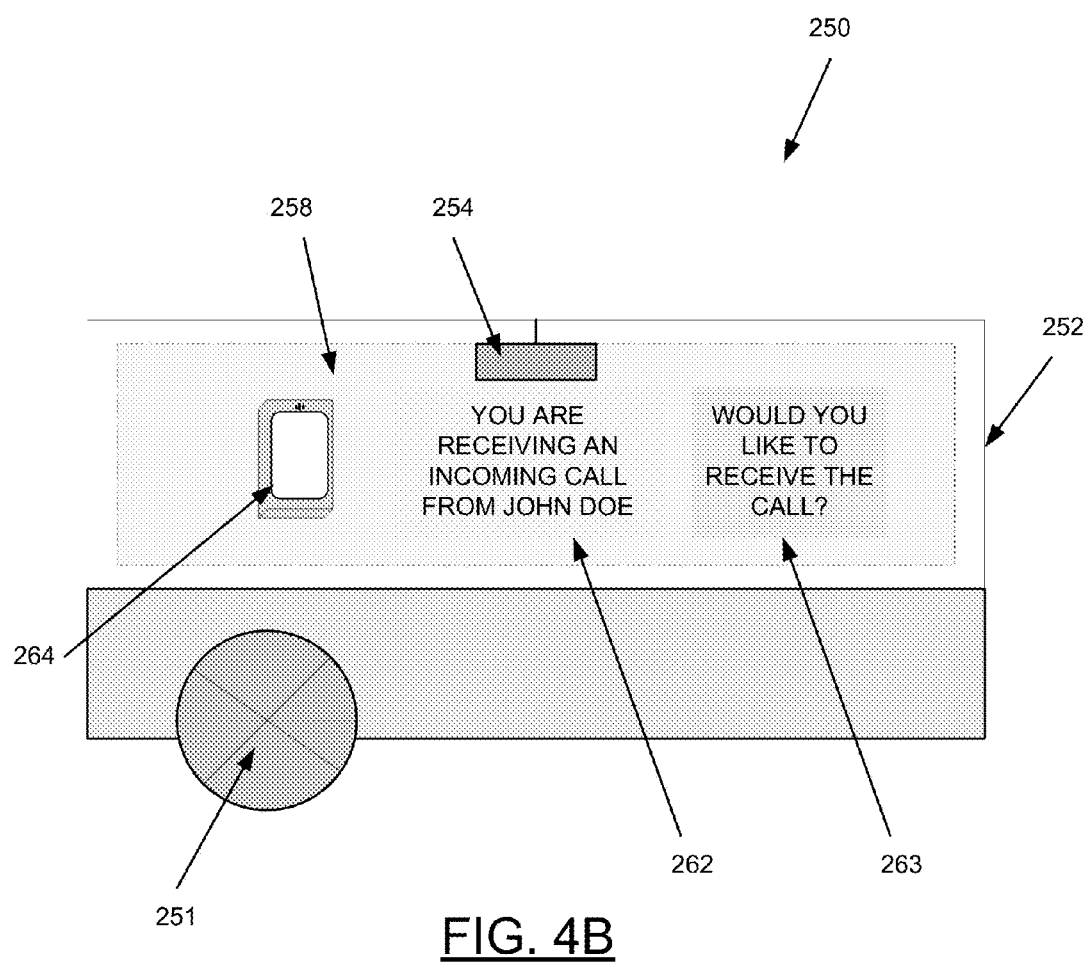
Figure 5B:
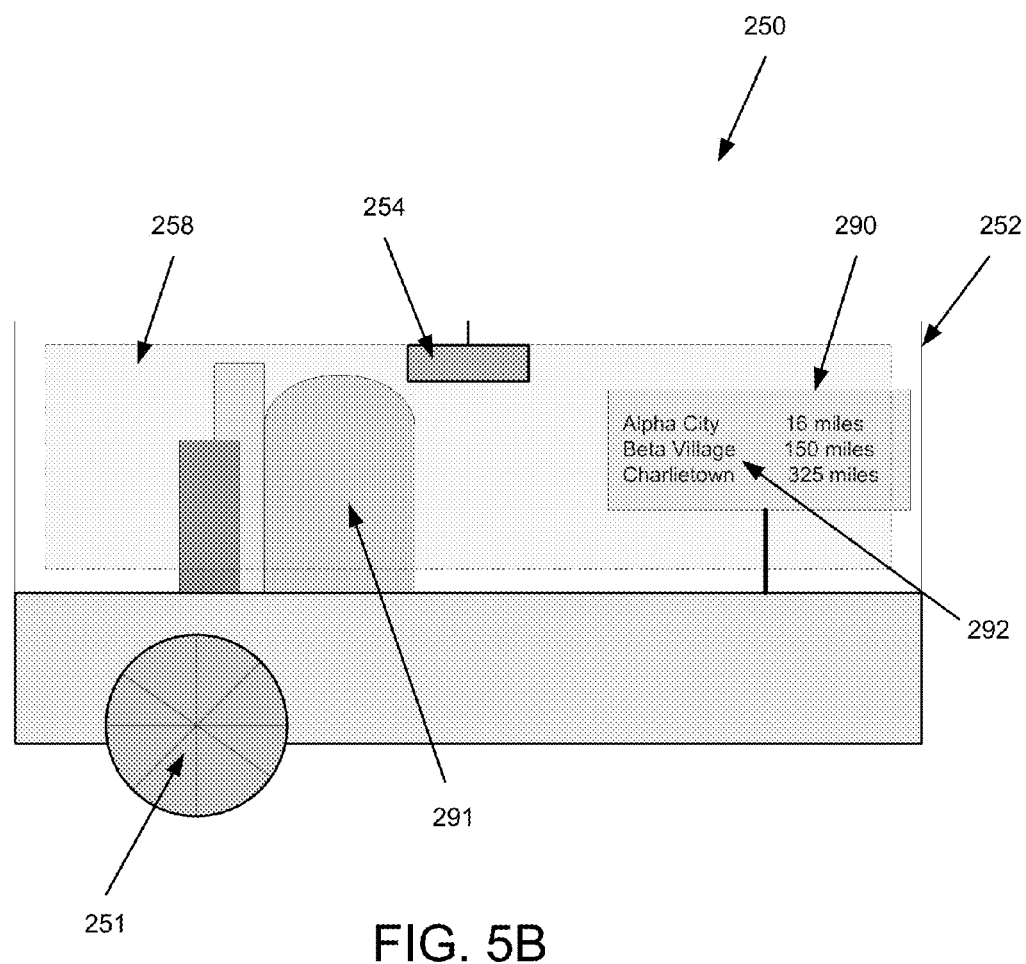
Figure 6B:
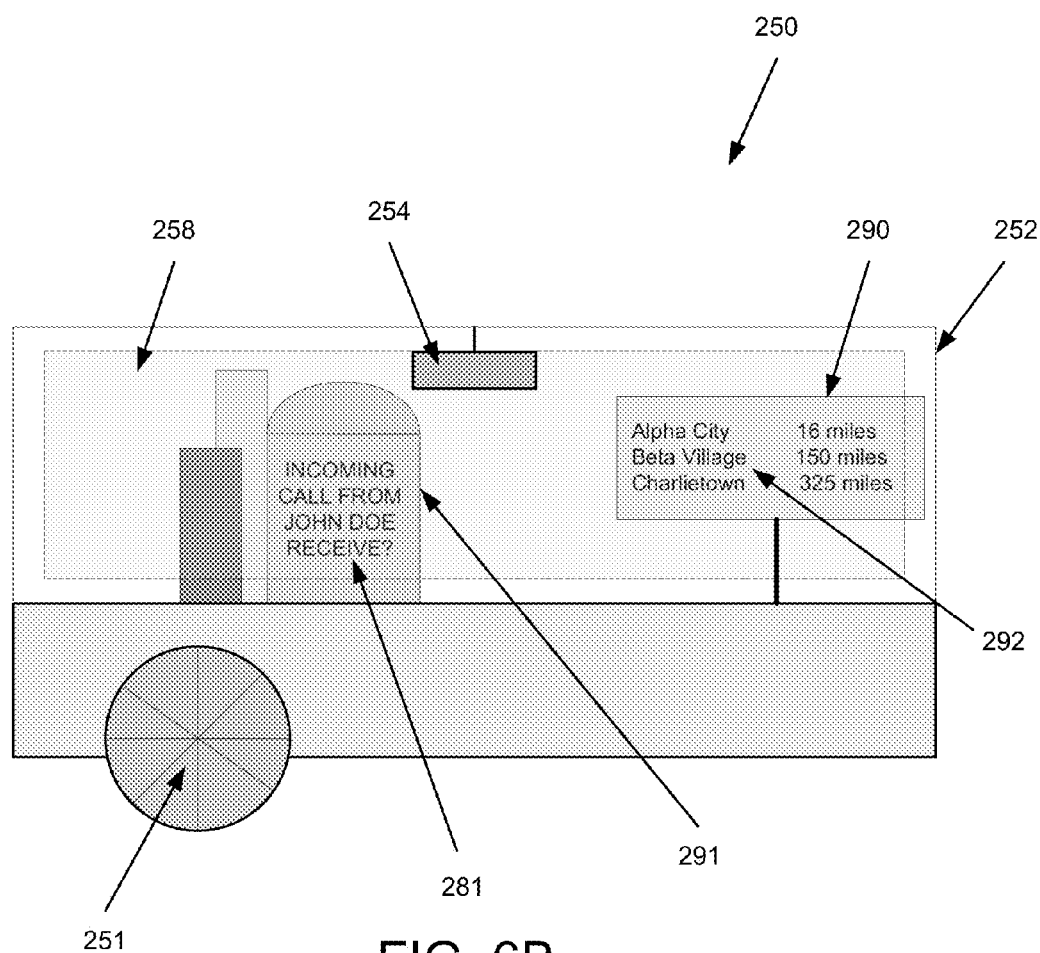
Figure 7A:
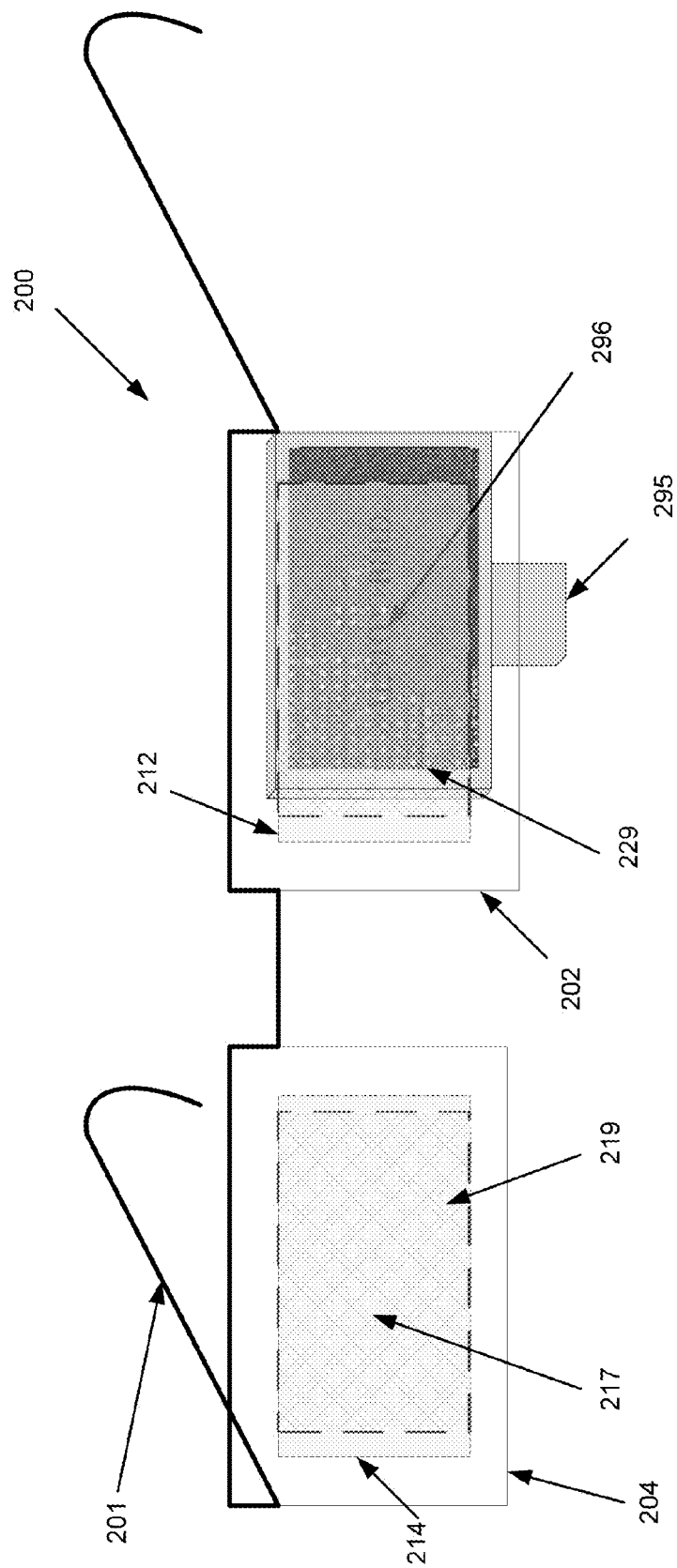
Figure 7B:
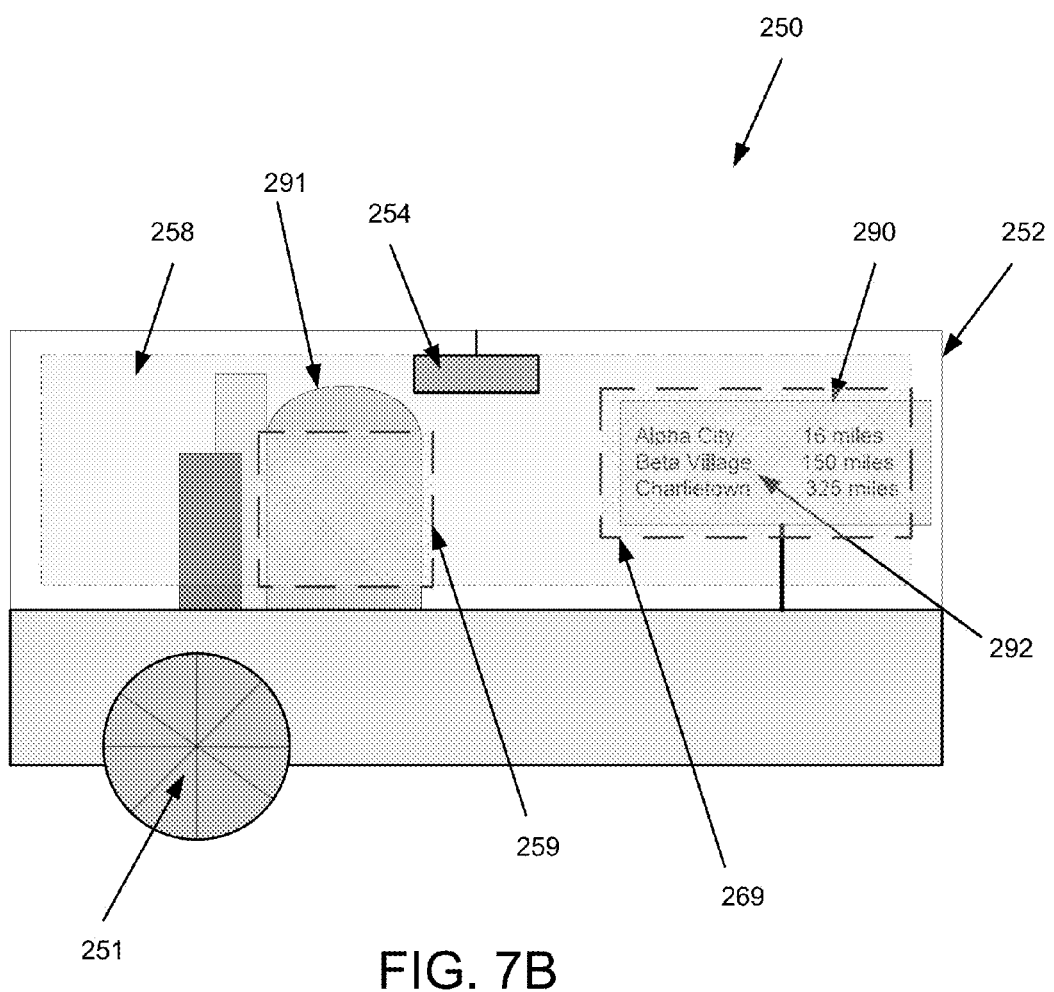
Figure 8B:
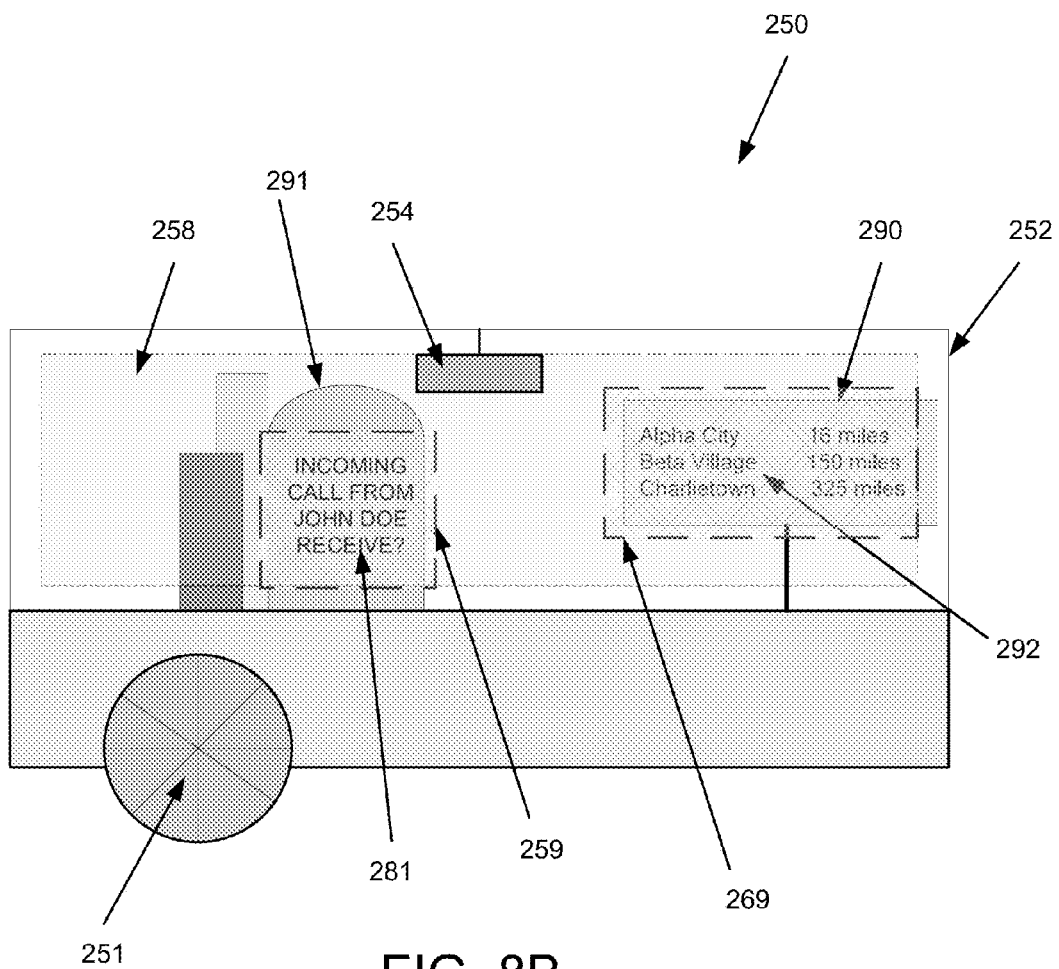
Figure 9A:
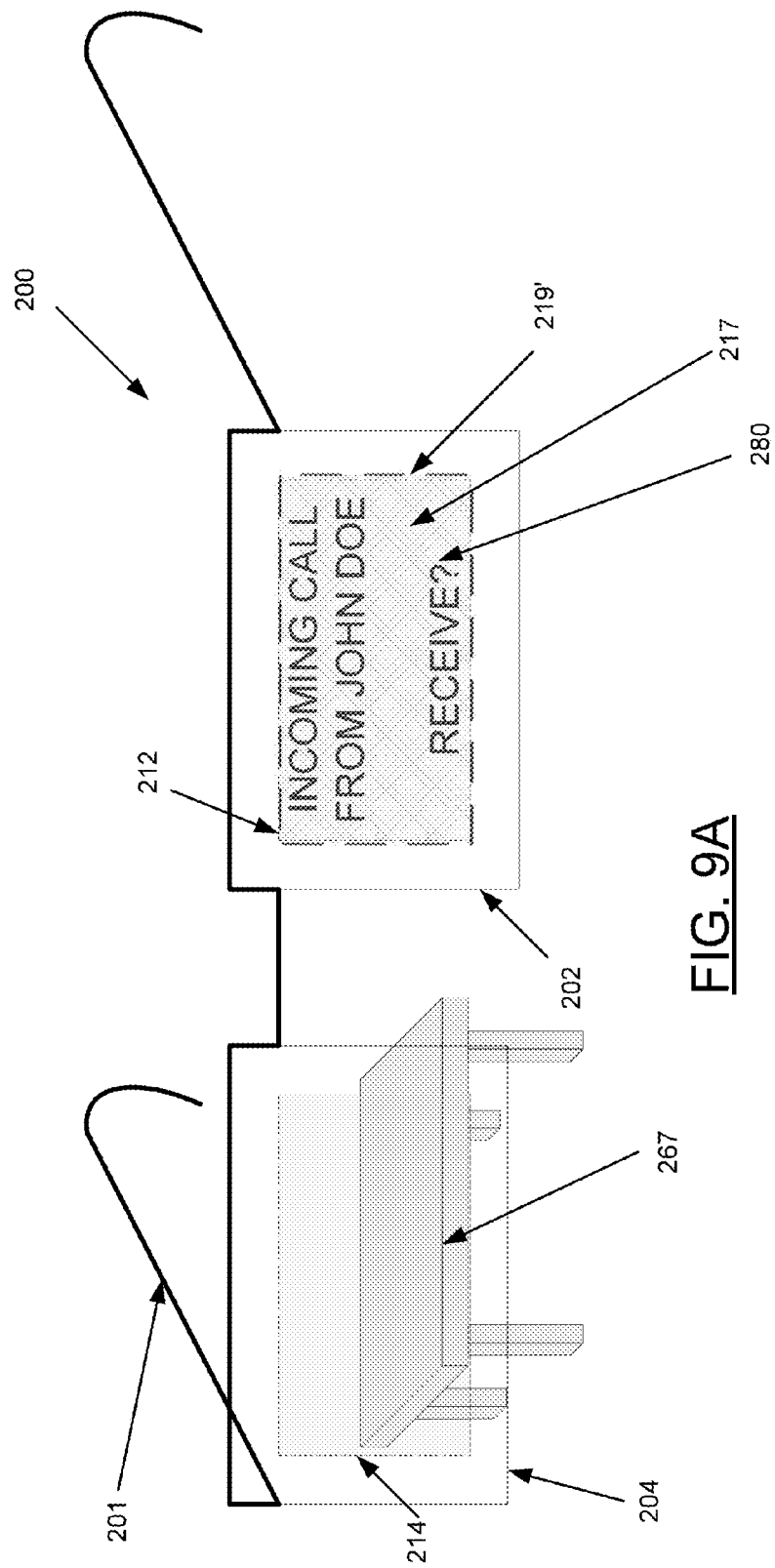
Figure 9B:
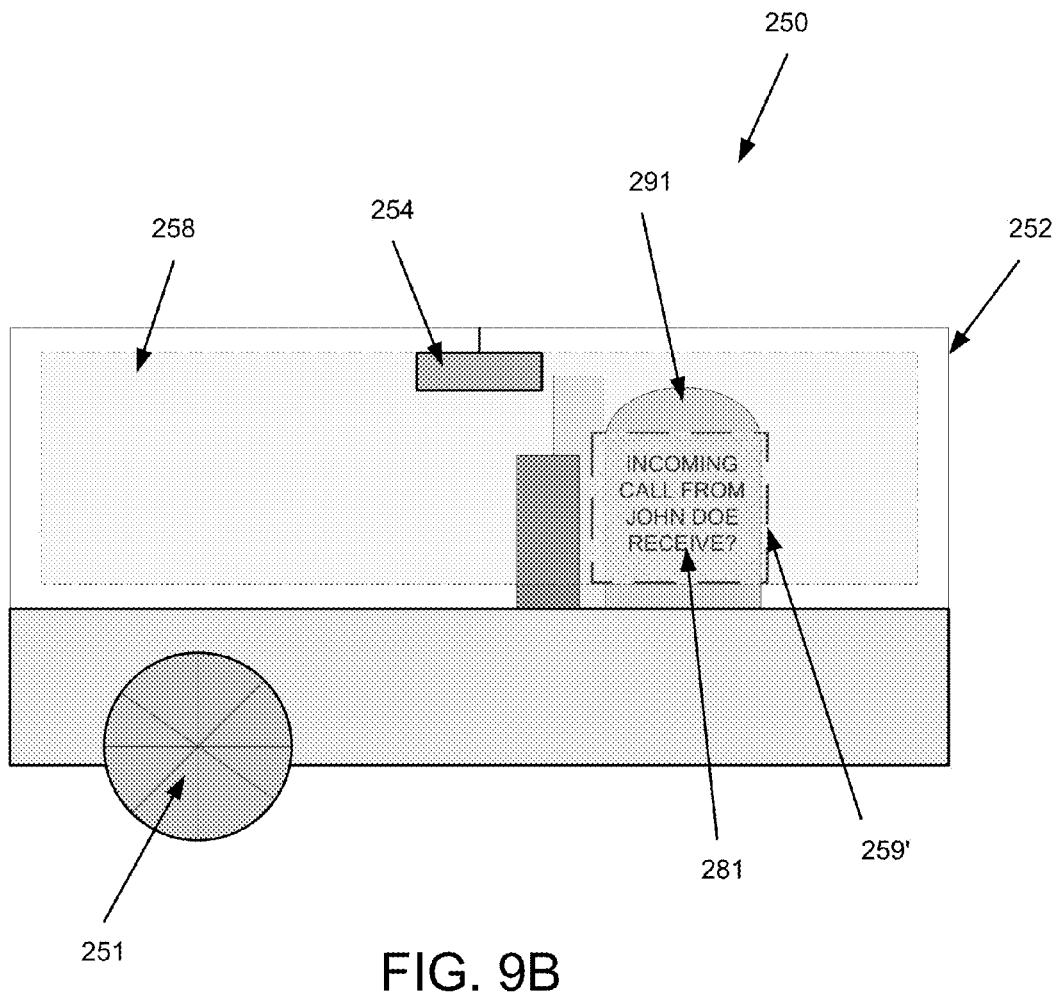
Figure 10:
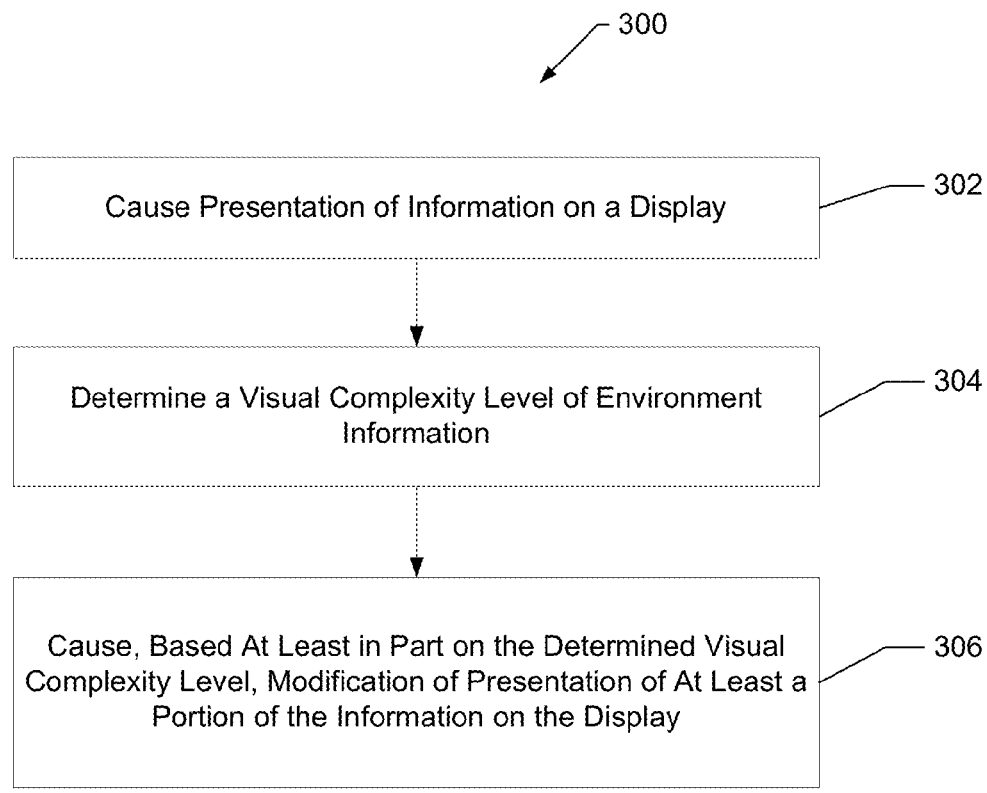
Figure 11:
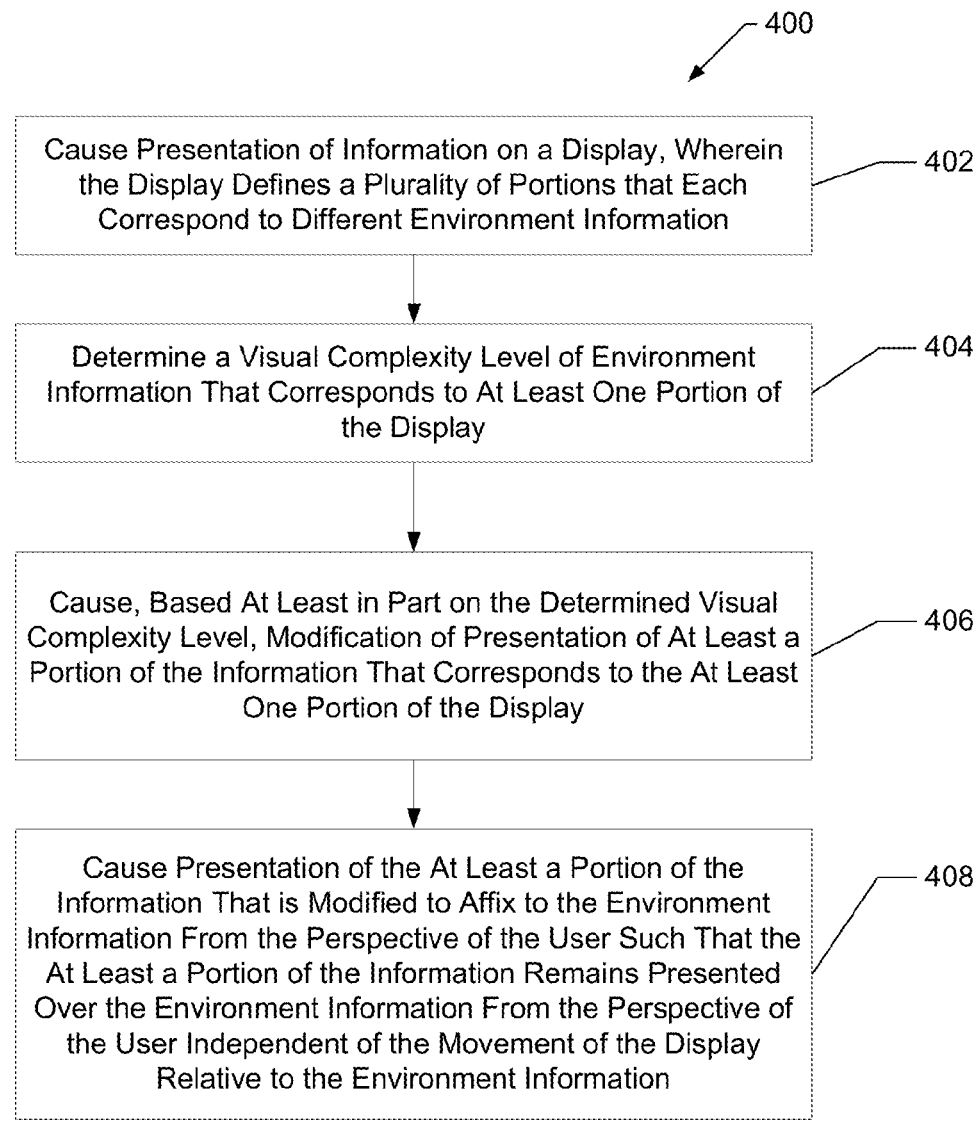

Having thus described some embodiments of the invention in general terms, reference will now be made to the accompanying drawings, which are not necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIG. 3A illustrates an example head-mounted display that may embody, for example, the apparatus shown in FIG. 1, wherein the display is pass-through such that a city skyline can be seen through the display, in accordance with an example embodiment of the present invention;

FIG. 3B illustrates an example pass-through windshield display for a car that may embody, for example, the apparatus shown in FIG. 1, wherein a city skyline can be seen through the display, in accordance with an example embodiment of the present invention;

FIG. 4A illustrates the head-mounted display shown in FIG. 3A, wherein information providing a notification of an incoming call is presented on the display, in accordance with an example embodiment described herein;

FIG. 4B illustrates the pass-through windshield display shown in FIG. 3B, wherein information providing a notification of an incoming call is presented on the display, in accordance with an example embodiment described herein;

FIG. 5A illustrates the head-mounted display shown in FIG. 3A, wherein a computer screen can be seen through a portion of the head-mounted display, in accordance with an example embodiment described herein;

FIG. 5B illustrates the pass-through windshield display shown in FIG. 3B, wherein a city skyline and a sign can be seen through a portion of the windshield display, in accordance with an example embodiment described herein;

FIG. 6A illustrates the head-mounted display shown in FIG. 4A, wherein the information being presented has been modified based on the computer screen, in accordance with an example embodiment described herein;

FIG. 6B illustrates the pass-through windshield display shown in FIG. 4B, wherein the information being presented has been modified based on the city skyline and sign, in accordance with an example embodiment described herein;

FIG. 7A illustrates the head-mounted display shown in FIG. 5A, wherein the head-mounted display defines different portions, in accordance with an example embodiment described herein;

FIG. 7B illustrates the pass-through windshield display shown in FIG. 5B, wherein the windshield display defines different portions, in accordance with an example embodiment described herein;

FIG. 8A illustrates the head-mounted display shown in FIG. 7A, wherein the information being presented has been modified based on the environment information seen through the portions of the head-mounted display, in accordance with an example embodiment described herein;

FIG. 8B illustrates the pass-through windshield display shown in FIG. 7B, wherein the information being presented has been modified based on the environment information seen through the portions of the windshield display, in accordance with an example embodiment described herein;

FIG. 9A illustrates the head-mounted display shown in FIG. 8A, wherein the information being presented has been affixed to the blank wall, in accordance with an example embodiment described herein;

FIG. 9B illustrates the pass-through windshield display shown in FIG. 8B, wherein the information being presented has been affixed to the large building, in accordance with an example embodiment described herein;

FIG. 10 illustrates a flowchart according to an example method for modifying the presentation of information based on the visual complexity of environment information, in accordance with an example embodiment described herein; and FIG. 11 illustrates a flowchart according to another example method for modifying the presentation of information based on the visual complexity of environment information, in accordance with an example embodiment described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a BLU-RAY disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for modifying the presentation of information based on the visual complexity of environment information. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a display. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the computing device are illustrated and will be hereinafter described for purposes of example, other types of computing devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to WI-FI, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to WI-FI or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs (e.g., applications), which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a pass-through display, a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may be non-transitory and may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, sensor 118, and/or UI control circuitry 122, such as via a bus.

The sensor 118 may be in communication with the processor 110, user interface 116, and/or UI control circuitry 122. In embodiments wherein the apparatus 102 is embodied as a mobile terminal 10, the sensor 118 may be embodied as or comprise the sensor 18 (shown in FIG. 2). In some embodiments, the sensor 118 may be configured to detect changes in movement or behavior of a user's eyes. In some embodiments, the sensor 118 may be configured to track a user's gaze, such as by detecting the location and/or focus point of the user's eyes. For example, the sensor 118 may be configured to transmit a beam or other signal (e.g., an infrared light) that bounces off the user's eyes (e.g., the user's cornea). The sensor 118 may also be configured to receive the beam or other signal upon its return. In some embodiments, the sensor 118 may be configured to detect patterns in the user's eye movement. Additionally or alternatively, the sensor 118 may to detect or measure a user's pupil dilation. Along these same lines, the sensor 118 may be configured to detect the size of a user's pupil in order to determine the user's focus point in a three-dimensional environment (e.g., depth of the user's focus point). In some embodiments, the sensor 118 may provide output (e.g., signals, beams, pictures, videos, etc.) to the processor 110 to enable the processor 110 to determine certain circumstances regarding the user's gaze (e.g., location, focus point, pupil dilation, etc.). This information may be used to determine changes in movement or behavior of the user's gaze. Similarly, the sensor 118 may be configured to monitor other features of the user, such as the movement of the user's eyelids, including excessive blinking or heavy-lidded behavior, among others. In some embodiments, the sensor 118 may comprise a gaze tracker. In such an embodiment, the sensor 118 may be configured to provide output indicative of the any of the above detections to the apparatus 102 (e.g., the processor 110), such as for determination of the visual complexity of environment information, which the user may be looking at.

Additionally, in some embodiments, the sensor 118 may comprise a front-facing camera. In some embodiments, the front-facing camera may be useful for an apparatus with a pass-through display to help detect (e.g., with pictures, videos, etc.) the environment information the user is looking at through the display (e.g., from the perspective of the user). Indeed, in some embodiments, the front-facing camera may provide output to the apparatus 102 (e.g., the processor 110), which may help the apparatus 102 determine the visual complexity of the environment information, such as may be useful for example embodiments of the present invention.

As used herein, example embodiments of the apparatus 102 may include any type of sensor 118 or combination of sensors 118, such as a gaze tracker and a front-facing camera, among others.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

In some embodiments, the user interface 116 may comprise a pass-through display. Likewise, in embodiments wherein the apparatus 102 is embodied as a mobile terminal 10, the display 28 may be embodied as a pass-through display. In some embodiments, a pass-through display may be configured to present information (e.g., text, icons, pictures, videos, visual attractants, etc.) in an at least partially transparent form (e.g., image overlay) such that a user may be able to see through the information being presented.

As such, some example embodiments may provide for an apparatus (e.g., apparatus 102) for providing input through a device comprising a display, such as the glasses 150 shown in FIG. 3A or the windshield 170 shown in FIG. 3B. The apparatus with a pass-through display may provide a visual overlay of information on a substantially transparent display surface, such as through lenses that appear to be normal optical glass lenses. This visual overlay allows a user to view objects and people in their typical, un-obscured field of view while providing additional information that may be displayed on the pass-through display. The visual overlay of the information may be of various opacity ranging from transparent (or 0% opacity) to opaque (or 100% opacity). For example, the information presented on the pass-through display may, in some cases, fully occlude the user's vision beyond the information presented on the display by being presented in a substantially opaque manner on a substantially transparent display. In some embodiments, the presented information may be partially transparent such that the user (e.g., wearer) is able to see the environment beyond the pass-through display. The degree of transparency may be variable from fully transparent, where the information is not shown, to fully opaque or non-transparent, or any degree therebetween.

Example embodiments may also present information at the edges of the pass-through display. For example, the pass-through display of one embodiment may include a central area of the display which is substantially transparent with less transparent and possibly opaque information being presented around the substantially transparent area. Such an embodiment may allow a user to view their environment (e.g., environment information) through the central area, while also providing information for the user to view peripherally thereabout.

Presentation of information on a pass-through display coupled with object recognition allows for dynamically interactive information to be presented to a user. Apparatuses with pass-through displays allow for the presentation of two-dimensional (2-D) and/or three-dimensional (3-D) visual elements. Two-dimensional graphical elements rendered in the plane of the display can present the user with a user interface, status elements, or other information as would be viewed on a typical computer screen or display of a mobile terminal (e.g., display 28 of mobile terminal 10). Similarly, three-dimensional graphical elements may be rendered on top of the display or on top of the environment and seen through the pass-through display. In such a manner, these visual elements can communicate messages, alert the user with a notification, render an application that is currently in use, etc. Additionally, these visual elements may provide images regarding an object that a user of the pass-through display is viewing through the display, such as by identifying a point-of-interest or landmark that a user is viewing. Such identification may be accomplished by various means including object recognition software or object recognition in conjunction with location identification (e.g., via Global Positioning System (GPS) signals) of the apparatus (e.g., apparatus 102) or the device that embodies the apparatus, such as mobile terminal 10.

Additionally, in some embodiments, the apparatus (e.g., apparatus 102), may be multi-modal so as to provide additional feedback to the user. For example, the apparatus may provide audio feedback in addition to the presentation of information. Additionally or alternatively, the apparatus may provide tactile feedback (e.g., vibration) to the user.

Some examples of apparatuses (e.g., apparatus 102) with a pass-through display are illustrated in FIGS. 3A and 3B. FIG. 3A illustrates an example head-mounted display (e.g., glasses 150) that includes a left lens 154 and a right lens 152. Such left lens 154 and right lens 152 may be configured to interact with a user's left eye and right eye respectively. Additionally, the glasses 150 may include a frame 151 that is configured to engage with a user's head (e.g., ears) to mount to the user's head.

In some embodiments, the glasses 150 may comprise (or be in communication with) a processor (e.g., processor 110) that is configured to control presentation of information. For example, in the depicted embodiment of the glasses 150, the processor may be configured to control presentation of information to create a left lens display 164 and a right lens display 162. In some embodiments, the information presented on the left lens display 164 and right lens display 162 may be independent and/or they may be complementary.

As illustrated in FIG. 3A, a user (not shown) may look through the left lens 154 and right lens 152 and the left lens display 164 and right lens display 162 presented thereupon to see information, such as a city skyline 190. Additionally, in some embodiments, the glasses 150 may be configured to cause presentation on the left lens display 164 and/or right lens display 162. In the depicted embodiment, the description "CITY SKYLINE" 180 is being presented to the user in the left lens displays 164 and right lens display 162 to indicate that the user is looking at the skyline of the city (e.g., through the left lens 154 and right lens 152). Though words are shown as being presented on the display, some embodiments of the present invention contemplate presenting other types of information on the display (e.g., pictures, videos, notifications, visual attractants, etc.). Additionally, though the words shown in FIG. 3A are not transparent, some embodiments of the present invention contemplate presentation of at least partially transparent information on the display.

FIG. 3B illustrates an example car 170 that may embody the apparatus 102 with a windshield with a pass-through display. In the depicted embodiment, the car 170 includes a dashboard 172, steering wheel 171, rear-view mirror 173 and windshield 175. The windshield 175 includes a display 176. In some embodiments, the car 170 may comprise (or be in communication with) a processor (e.g., processor 110) that is configured to control presentation of information. For example, in the depicted embodiment of the car 170, the processor may be configured to control presentation of information on the display 176 of the windshield 175.

As illustrated in FIG. 3B, a user (not shown) may look through the windshield 175 and the display 176 to see environment information, such as a city skyline 190. Additionally, in some embodiments, the car 170 may be configured to cause presentation of information on the display 176. In the depicted embodiment, the description "CITY SKYLINE" 180 is being presented to the user on the display 176 to indicate that the user is looking at the skyline of the city (e.g., through the windshield 175). Though words are shown as being presented on the display, some embodiments of the present invention contemplate presenting other types of information on the display (e.g., pictures, videos, notifications, visual attractants, etc.). Additionally, though the words shown in FIG. 3B are not transparent, some embodiments of the present invention contemplate presentation of at least partially transparent information on the display.

It should also be noted that while FIGS. 3A and 3B each illustrate one example of an apparatus with a pass-through display, numerous other apparatuses configured with a pass-through display are contemplated for embodiments of the present invention (e.g., a helmet visor, a cockpit windshield, etc.). Moreover, embodiments of the present invention are not meant to be limited to apparatuses with pass-through displays, and may be useful with other example apparatuses, such as any apparatus 102 (e.g., mobile terminal 10) described herein (e.g., a mobile computing device, a fixed computing device, etc.) having or associated with the display.

Returning to FIG. 1, the UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, sensor 118, and/or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

In some embodiments, the apparatus 102 may be configured to receive other forms of user input (e.g., speech, gestures, etc.). Similarly, receipt of touch input by a user should not be limited to the display and may include any portion of the apparatus 102.

In some embodiments, the apparatus 102 may be configured to cause presentation of information on a display. The information presented on the display may, in some cases, be based on the operation being performed by the apparatus 102. For example, with reference to FIG. 4A, glasses 200 (such as an example embodiment of apparatus 102) may include a left lens 204 and a right lens 202 with a left lens display 214 and a right lens display 212, respectively. The glasses 200 may attach to a user's head, such as with a frame 201. In the depicted embodiment, the information indicating that the user is receiving an incoming call is being presented on both the left lens display 214 and the right lens display 212. In particular, a message "YOU ARE RECEIVING AN INCOMING CALL FROM JOHN DOE" 222 is presented on the left lens display 214. Additionally, a phone icon 226 and a message "WOULD YOU LIKE TO RECEIVE THE CALL?" 223 is presented on the right lens display 212. As shown in FIG. 4A, the message 222 may be presented within a different visual field of the user from the message 223 and the phone icon 226. As such, as the user looks through the glasses 200 (e.g., through both the left lens display 214 and right lens display 212) the message 222 may not overlap or jumble with the message 223 and phone icon 226.

Thus, in some embodiments, such as shown in FIG. 4A, the presentation of information on the left lens display 214 and right lens display 212 may be positioned to align with separate visual fields for the user. In this regard, and in any embodiments described herein, the information presented on only one of the left lens display 214 or right lens display 212 may, in some embodiments, be presented on the other lens display and in a corresponding visual field. Along these same lines, though some of the depicted embodiments present information on only one lens display so that the information being presented is positioned "over" particular background information, some embodiments may present the information on both the left lens display 214 and right lens display 212, but within the visual field that corresponds with the particular background information (e.g., from the user's perspective). For example, an example embodiment described with respect to FIG. 6A presents the message "INCOMING CALL FROM JOHN DOE RECEIVE?" 280 "over" a blank wall 217. Thus, the depicted embodiment shows the message 280 being presented on the left lens display 214. However, the user's visual field to the blank wall 217 may include a portion of the right lens display 212. In such a situation, some embodiments may be configured to present the information on the portion of the right lens display 212 within the visual field of the user that corresponds to the blank wall 217. Thus, even though the message 280 would be presented on the right lens display 212, it may still be positioned "over" the blank wall 217 from the perspective of the user. Along these same lines, no information may be presented on a portion of the left lens display 214 in the visual field of the user that corresponds with the computer screen 296.

In another example embodiment, with reference to FIG. 4B, an example apparatus (e.g., apparatus 102) associated with a car 250 and a windshield 252, may include a pass-through display 258. The car 250 may also include a steering wheel 251 and a rear-view mirror 254. The apparatus associated with the car 250 may cause presentation of information on the pass-through display 258 (e.g., information indicating that the user is receiving an incoming call). In the depicted embodiment, a phone icon 264, a message "YOU ARE RECEIVING AN INCOMING CALL FROM JOHN DOE" 262, and another message "WOULD YOU LIKE TO RECEIVE THE CALL?" 263 is presented on the pass-through display 258.

In some embodiments, the apparatus 102 may be configured to monitor environment information that is visible through the display. In some embodiments, the apparatus 102 may be configured to determine the visual complexity of the environment information, such as by determining a visual complexity level of the environment information.

In some embodiments, the apparatus 102 may be configured to determine the visual complexity of the environment information with sensor 118. In such embodiments, the sensor 118 may be configured to provide an output, such as to the processor 110, and the apparatus 102 may determine the visual complexity of the environment information, based at least in part on the output of the sensor 118.

As noted above, in some embodiments, the sensor 118 may comprise a front-facing camera. In some embodiments, the apparatus 102 may be configured to determine the visual complexity level of environment information based at least in part on output received from the front-facing camera. In such a regard, the front-facing camera may record or capture image data of the environment information that the user is looking at. That image data may be provided to the apparatus 102 for use in determination of the visual complexity of the environment information. In some embodiments, the image data may be analyzed for any number of characteristics of the environment information indicative of visual complexity (e.g., degree of contrast in colors, size, proximity to the user, intensity, clarity, etc.). For example, the image data may provide an image of a computer screen with a number of characters on the screen. In response, the apparatus 102 may determine that the environment information of the computer screen has a high visual complexity level. Along these same lines, the image data may provide an image of a blank wall, which may cause the apparatus 102 to determine that the environment information has a low visual complexity level.

Additionally or alternatively, as noted above, in some embodiments, the sensor 118 may comprise a gaze tracker. In some embodiments, the apparatus 102 may be configured to determine the visual complexity level of environment information based at least in part on output received from the gaze tracker. For example, the gaze tracker may be configured to detect at least one of movement or behavior of the user's eyes or eyelids. Indeed, such movement or behavior may indicate a pattern that may help in determination of the visual complexity of the environment information that the user is looking at. For example, pupil dilation may indicate that the user is focusing on something, which may indicate a high visual complexity level for what the user is looking at. Likewise, quick shifting of focus of the user's eyes may also indicate a high visual complexity level of the environment information.

With reference to FIG. 5A, a user may be looking through glasses 200 with a pass-through display of a left lens display 214 and a right lens display 212. In the depicted embodiment, the user is looking at a wall 217 through the left lens display 214 and a computer screen 296 with a stand 295 through the right lens display 212. The glasses 200 may determine, such as through a sensor (e.g., sensor 118), that the wall 217 (e.g., environment information) has a low visual complexity level and that the computer screen 296 (e.g., environment information) has a high visual complexity level.

With reference to FIG. 5B, a user may be looking through a pass-through windshield display 258. In the depicted embodiment, the user is looking at a large building 291 on the left portion of the windshield display 258 and a sign 290 with mileage information 292 on the right portion of the windshield display 258. The apparatus associated with the windshield display 258 may determine, such as through a sensor (e.g., sensor 118), that the large building 291 (e.g., environment information) has a low visual complexity level and that the sign 290 with mileage information 292 (e.g., environment information) has a high visual complexity level.

As used herein, the visual complexity level may be defined by any absolute or relative qualifier (e.g., numbers, high/low, etc.). For example, environment information that is visually complex may be determined to have a visual complexity level that is high. Along these same lines, environment information that is less visually complex may be determined to have a low visual complexity level. Similarly, the visual complexity level may be based on a number system (e.g., 0-10), such that very visually complex environment information may be determined to have a visual complexity level of 9 and not so visually complex environment information may be determined to have a visual complexity level of 3.

Pass-through displays (e.g., head-mounted displays, augmented reality glasses, video or optical see-through displays, etc.) enable users to be presented with information while still interacting with their environment through the information. In particular, as noted above, the information may be presented on a display such that it overlays environment information. However, increased functionality has led to increased use, which may require a large amount of information to be presented on the display. Moreover, in some cases, the environment information may be visually complex. Thus, depending on the amount of information being presented and the visual complexity of the environment, it can be difficult for the user to read and/or process the presented information. Additionally, presenting information on visually complex environment information can cause the user to be interrupted from their current task.

As such, some embodiments of the present invention seek to provide a method for modifying presentation of the information to account for the visual complexity of the environment information, thereby providing a dynamic user interface that adapts to the environment the user is looking at. Some example embodiments of the present invention may modify the presentation of information on the display based on the visual complexity of the environment information that the information is being presented over. In such a manner, the information being presented can be optimized based on the environment, thereby enabling a user to more easily perceive the information.

Thus, in some embodiments, the apparatus 102 may be configured to cause, based at least in part on the determined visual complexity level, modification of presentation of at least a portion of the information on the display. In such a regard, the apparatus 102 may be configured to adapt the presentation of the information based on the visual complexity of the environment the user is looking at.

With reference to FIG. 6A, the glasses 200 may have determined that the computer screen 296 has a high visual complexity level and that the wall 217 has a low visual complexity level. Thus, the glasses 200 may modify the presentation of information on the left lens display 214 and the right lens display 212 due to the visual complexity level of the environment information. For example, similar to the situation described with respect to FIG. 4A, a user may receive an incoming call from John Doe. However, instead of presenting the information indicating the incoming call with a phone icon 226 and the message "YOU ARE RECEIVING AN INCOMING CALL FROM JOHN DOE" 222 being presented on the left lens display 214 and the message "WOULD YOU LIKE TO RECEIVE THE CALL?" 223 being presented on the right lens display 212 (see FIG. 4A), the glasses 200 may cause a modified message 280 of "INCOMING CALL FROM JOHN DOE RECEIVE?" to be presented only on the left lens display 214. The modified message 280 may simplify the information being presented to the user and may even provide an enlarged font size. Additionally, by presenting the message 280 in the left lens display 214 only, the user's view of the computer screen 296 (e.g., with a high visual complexity level) is not obscured. Instead, the message 280 is presented "over" the wall 217, which was determined to have a low visual complexity level, thereby allowing the user to more easily perceive the message 280.

With reference to FIG. 6B, the apparatus associated with the pass-through windshield display 258 may have determined that the sign 290 with mileage information 292 has a high visual complexity level and that the large building 291 has a low visual complexity level. Thus, the apparatus may modify the presentation of information on the windshield display 258 due to the visual complexity level of the environment information. For example, similar to the situation described with respect to FIG. 4B, a user may receive an incoming call from John Doe. However, instead of presenting the information indicating the incoming call with a phone icon 264, the message "YOU ARE RECEIVING AN INCOMING CALL FROM JOHN DOE" 262, and the message "WOULD YOU LIKE TO RECEIVE THE CALL?" 263 being presented on the windshield display 258 (see FIG. 4B), the apparatus may cause a modified message of "INCOMING CALL FROM JOHN DOE RECEIVE?" to be presented on the windshield display 258. The modified message 281 may simplify the information being presented to the user and may even provide an enlarged font size, thereby allowing the user to more easily perceive the message 280. Additionally, the message 281 may be presented "over" the large building 291, which was determined to have a low visual complexity level. This will not obscure the user's view of the sign 290 with mileage information 292 (e.g., with a high visual complexity level).

In some embodiments, the apparatus 102 may be configured to cause presentation of the information to become less complex in an instance in which the determined visual complexity level of the environment information is greater than a pre-determined visual complexity level. In some cases, the apparatus 102 may define a pre-determined visual complexity level that corresponds to a visual complexity level that is too complex for certain presentation of information, such that information being presented should automatically be modified to become less complex. For example, the apparatus 102 may define the pre-determined visual complexity level to be high. Thus, with reference to FIG. 6A, the information being presented (e.g., message 280) has been modified to become less complex (e.g. moved on the display, enlarged font, portions removed, etc.) due to the determination of a high visual complexity level of the computer screen 296. Likewise, with reference to FIG. 6B, the information being presented (e.g., message 281) has been modified to become less complex (e.g. moved on the display, enlarged font, portions removed, etc.) due to the determination of a high visual complexity level of the sign 290 with mileage information 292.

Additionally, in some embodiments, the apparatus 102 may be configured to modify presentation of the information by causing at least a portion of the information to be removed. For example, with reference to the difference in the presentation of information shown in FIGS. 4A and 6A, presentation of the phone icon 226 has ceased. Similarly, with reference to difference in the presentation of information shown in FIGS. 4B and 6B, presentation of the phone icon 264 has ceased.

As used herein, many different ways to modify presentation of information to become "less complex" are contemplated by embodiments of the present invention. For example, though example embodiments described herein show different positioning of the presented information, other modifications are envisioned (e.g., font style, color, contrast, texture, location on the display, etc.). Similarly, example embodiments may modify the presentation of the display in other ways to cause information to be presented in a less complex format (e.g., remove distracting information, present icons only, etc.).

As noted above, in some embodiments, the apparatus 102 may be configured to cause a modification of at least a portion of the information being presented in at least one of: size, color, or brightness. For example, as illustrated in FIG. 6A, the message 280 has been enlarged and is presented in the color red. Similarly, as illustrated in FIG. 6B, the message 281 has been enlarged and is presented in the color red.

In some embodiments, the apparatus 102 may be configured such that the display is defined into a plurality of portions that each correspond to different environment information. In such embodiments, the apparatus 102 may be configured to determine the visual complexity level for environment information that corresponds to at least one portion of the display.

For example, with reference to FIG. 7A, the glasses 200 may define a portion 219 that corresponds to the wall 217. Such a portion 219 may, in the embodiment of the glasses 200, correspond to at least a portion of the left lens display 214. Similarly, the glasses 200 may define a portion 229 that corresponds to the computer screen 296. Such a portion 229 may correspond to at least a portion of the right lens display 212. The glasses 200 may determine that the portion 219 corresponding with the wall 217 has a low visual complexity level. Additionally, the glasses 200 may determine that the portion 229 corresponding with the computer screen 296 has a high visual complexity level.

Along these same lines, with reference to FIG. 7B, the apparatus associated with the windshield display 258 may define a portion 259 that corresponds to the large building 291. Similarly, the apparatus associated with the windshield display 258 may define a portion 269 that corresponds to the sign 290 with the mileage information 292. The apparatus may determine that the portion 259 corresponding with the large building 291 has a low visual complexity level. Additionally, the apparatus may determine that the portion 269 corresponding with the sign 290 with the mileage information 292 has a high visual complexity level.

In some embodiments, the apparatus 102 may be configured to cause modification of presentation of the at least a portion of the information that corresponds to the at least one portion of the display. In such a way, the apparatus 102 may maximize and customize presentation of information on the limited display space by modifying portions of the display according to their corresponding environment information. For example, similar to the embodiments shown with respect to FIGS. 6A and 6B, information presented over a portion of the display with a high visual complexity level may be modified to become less complex. Such an example is illustrated in FIG. 8A as the message 280 is presented within the portion 219 that corresponds to the wall 217 and there is no information presented within the portion 229 that corresponds to the computer screen 296. Thus, in such an example embodiment, if a user is looking at a blank wall, more complex information may be presented on the pass-through display. In contrast, if a user is looking at a computer screen with its own information presented on it, presenting further information on the display may cause the information to be difficult for the user to comprehend. Thus, some embodiments of the present invention provide a dynamic system that modifies the presentation of information based on the visual complexity of the environment information in order to optimize the user's experience.

Similarly, FIG. 8B illustrates that the message 281 is presented within the portion 259 that corresponds to the large building 291. Additionally, in the depicted embodiment, there is no information presented within the portion 269 that corresponds to the sign 290 with mileage information 292.

In some embodiments, the apparatus 102 may be configured to affix presentation of information to environment information. As noted above, some environment information may be determined to have a low visual complexity level. As such, it may be beneficial to leave the presentation of information "over" such environment information to enable the user to continue to easily read and/or process the presented information. Thus, even if the environment information moves relative to the display, the presented information will "affix" to the environment information. In such a manner, in some embodiments, the apparatus 102 may be configured to cause presentation of the at least a portion of the information that is modified to affix to the environment information from the perspective of the user such that the at least a portion of the information remains presented over the environment information from the perspective of the user independent of the movement of the display relative to the environment information.

For example, with reference to FIG. 9A, the user (who is wearing the glasses 200) has moved their head such that the computer screen 296 (shown in FIG. 8A) is not visible through the left lens display 214 or right lens display 212. Instead, the wall 217 can now be seen through the right lens display 212 and a table 267 can be seen through the left lens display 214. Additionally, the glasses 200 have caused the message 280 to remain affixed to the wall 217, such that the message 280, while still being presented "over" the wall 217, is actually presented on a different portion 219' of the right lens display 212 (instead of the left lens display 214, as shown in FIG. 8A).

Similarly, with reference to FIG. 9B, the car 250 has changed directions such that the sign 290 with mileage information 292 (shown in FIG. 8B) is not visible through the windshield display 258. Instead, the large building 291 can now be seen from a slightly different perspective through the windshield display 258. Additionally, the apparatus associated with the windshield display 258 has caused the message 281 to remain affixed to the large building 291, such that the message 281, while still being presented "over" the large building 291, is actually presented on a different portion 259' of the windshield display 258.

Embodiments of the present invention provide methods, apparatus and computer program products for modifying the presentation of information based on the visual complexity of environment information. Various examples of the operations performed in accordance with embodiments of the present invention will now be provided with reference to FIGS. 10-11.

FIG. 10 illustrates a flowchart according to an example method for modifying the presentation of information based on the visual complexity of environment information according to an example embodiment 300. The operations illustrated in and described with respect to FIG. 10 may, for example, be performed by, with the assistance of, and/or under the control of one or more of the processor 110, memory 112, communication interface 114, user interface 116, sensor 118, or UI control circuitry 122. Operation 302 may comprise causing presentation of information on a display. The processor 110, user interface 116, and/or UI control circuitry 122 may, for example, provide means for performing operation 302. Operation 304 may comprise determining a visual complexity level of environment information. The processor 110, communication interface 114, user interface 116, sensor 118, and/or UI control circuitry 122 may, for example, provide means for performing operation 304. Operation 306 may comprise causing, based at least in part on the determined visual complexity level, modification of presentation of at least a portion of the information on the display. The processor 110, user interface 116, and/or UI control circuitry 122 may, for example, provide means for performing operation 306.

FIG. 11 illustrates a flowchart according to an example method for modifying the presentation of information based on the visual complexity of environment information according to an example embodiment 400. The operations illustrated in and described with respect to FIG. 11 may, for example, be performed by, with the assistance of, and/or under the control of one or more of the processor 110, memory 112, communication interface 114, user interface 116, sensor 118, or UI control circuitry 122. Operation 402 may comprise causing presentation of information on a display, wherein the display defines a plurality of portions that each correspond to different environment information. The processor 110, user interface 116, and/or UI control circuitry 122 may, for example, provide means for performing operation 402. Operation 404 may comprise determining a visual complexity level of environment information that corresponds to at least one portion of the display. The processor 110, communication interface 114, user interface 116, sensor 118, and/or UI control circuitry 122 may, for example, provide means for performing operation 404. Operation 406 may comprise causing, based at least in part on the determined visual complexity level, modification of presentation of at least a portion of the information on the display that corresponds to the at least one portion of the display. The processor 110, user interface 116, and/or UI control circuitry 122 may, for example, provide means for performing operation 406. In some embodiments, Operation 408 may comprise causing presentation of the at least a portion of the information that is modified to affix to the environment information from the perspective of the user such that the at least a portion of the information remains presented over the environment information from the perspective of the user independent of the movement of the display relative to the environment information. The processor 110, user interface 116, and/or UI control circuitry 122 may, for example, provide means for performing operation 408.

FIGS. 10-11 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   causing presentation of overlay information on a display in at least partially transparent form over environment information, wherein the environment information is currently visible to a user of a device through the display, wherein the overlay information is different than the environment information, wherein the display defines a plurality of portions that each correspond to different portions of the environment information;
   receiving current input from at least one forward-facing camera, wherein the current input includes the environment information;
   determining, by a processor, a visual complexity level of a portion of the environment information that corresponds to a portion of the display from the current input, wherein the visual complexity level is based on at least one of: a degree of contrast in colors of the environment information, a size of features within the environment information, a proximity of features within the environment information to the user, an intensity level of the environment information, or a clarity level of the environment information;
   determining a current view of the user through the display based on input received from a gaze tracker; and
   causing, based at least in part on the determined visual complexity level of the portion of the environment information and the current view of the user, in an instance in which the visual complexity level of the portion of the environment information is determined to be lower than a threshold visual complexity level, modification of a position of at least a portion of the overlay information on the display by causing the portion of the overlay information to be presented over and affixed to the portion of the environment information from perspective of the user such that the portion of the overlay information remains presented over the portion of the environment information from the perspective of the user independent of movement of the display relative to the portion of the environment information.

2. The method according to claim 1, further comprising causing modification of presentation of the portion of the overlay information to become less complex in an instance in which the determined visual complexity level of the portion of the environment information is greater than a second threshold visual complexity level.

3. The method according to claim 2, wherein causing presentation of the portion of the overlay information to become less complex comprises causing some of the portion of the overlay information to be removed.

4. The method according to claim 2, wherein causing modification of presentation of the portion of the overlay information comprises causing modification to the portion of the overlay information in at least one of: size, color, or brightness.

5. The method according to claim 1, wherein determining the visual complexity level comprises determining the visual complexity level based at least further in part on output provided by the gaze tracker.

6. The method of claim 1, wherein the display defines a pass-through display.

7. An apparatus comprising at least one processor and at least one memory including computer program code, the memory and the computer program code configured to, with the at least one processor, cause the apparatus to:
   cause presentation of overlay information on a display in at least partially transparent form over environment information, wherein the environment information is currently visible to a user of a device through the display, wherein the overlay information is different than the environment information, wherein the display defines a plurality of portions that each correspond to different portions of the environment information;
   receive current input from at least one forward-facing camera, wherein the current input includes the environment information;
   determine a visual complexity level of a portion of the environment information that corresponds to a portion of the display from the current input, wherein the visual complexity level is based on at least one of: a degree of contrast in colors of the environment information, a size of features within the environment information, a proximity of features within the environment information to the user, an intensity level of the environment information, or a clarity level of the environment information;
   determine a current view of the user through the display based on input received from a gaze tracker; and cause, based at least in part on the determined visual complexity level of the portion of the environment information and the current view of the user, in an instance in which the visual complexity level of the portion of the environment information is determined to be lower than a threshold visual complexity level, modification of a position of at least a portion of the overlay information on the display by causing the portion of the overlay information to be presented over and affixed to the portion of the environment information from perspective of the user such that the portion of the overlay information remains presented over the portion of the environment information from the perspective of the user independent of movement of the display relative to the portion of the environment information.

8. The apparatus of claim 7, wherein the at least one memory and the computer program code are further configured to, with the at least one processor, cause the apparatus to cause modification of presentation of the at least a portion of the overlay information to become less complex in an instance in which the determined visual complexity level of the portion of the environment information is greater than a second threshold visual complexity level.

9. The apparatus of claim 8, wherein the at least one memory and the computer program code are further configured to, with the at least one processor, cause the apparatus to cause presentation of the portion of the overlay information to become less complex by causing some of the portion of the overlay information being presented to be removed.

10. The apparatus of claim 8, wherein the at least one memory and the computer program code are further configured to, with the at least one processor, cause the apparatus to cause modification of presentation of the portion of the overlay information by causing modification to the portion of the overlay information in at least one of: size, color, or brightness.

11. The apparatus of claim 7, wherein the at least one memory and the computer program code are further configured to, with the at least one processor, cause the apparatus to determine the visual complexity level by determining the visual complexity level based at least further in part on output provided by the gaze tracker.

12. The apparatus of claim 7, wherein the display defines a pass-through display.

13. Computer program product comprising a non-transitory computer readable medium having program code portions stored thereon, the program code portions being configured when said program product is run on a computer or network device, to:
cause presentation of overlay information on a display in at least partially transparent form over environment information, wherein the environment information is currently visible to a user of a device through the display, wherein the overlay information is different than the environment information, wherein the display defines a plurality of portions that each correspond to different portions of the environment information;

receive current input from at least one forward-facing camera, wherein the current input includes the environment information;
determine a visual complexity level of a portion of the environment information that corresponds to a portion of the display from the current input, wherein the visual complexity level is based on at least one of: a degree of contrast in colors of the environment information, a size of features within the environment information, a proximity of features within the environment information to the user, an intensity level of the environment information, or a clarity level of the environment information;
determine a current view of the user through the display based on input received from a gaze tracker; and
cause, based at least in part on the determined visual complexity level of the portion of the environment information and the current view of the user, in an instance in which the visual complexity level of the portion of the environment information is determined to be lower than a threshold visual complexity level, modification of a position of at least a portion of the overlay information on the display by causing the portion of the overlay information to be presented over and affixed to the portion of the environment information from perspective of the user such that the portion of the overlay information remains presented over the portion of the environment information from the perspective of the user independent of movement of the display relative to the portion of the environment information.

14. The computer program product of claim 13, wherein the program code portions are further configured, when said program product is run on a computer or network device, to cause modification of presentation of the portion of the overlay information to become less complex in an instance in which the determined visual complexity level of the portion of the environment information is greater than a second threshold complexity level.

15. The computer program product of claim 14, wherein the program code portions are further configured, when said program product is run on a computer or network device, to cause presentation of the portion of the overlay information to be less complex by causing some of the portion of the overlay information to be removed.

16. The computer program product of claim 14, wherein the program code portions are further configured, when said program product is run on a computer or network device, to cause modification of presentation of the portion of the overlay information by causing modification to the portion of the overlay information in at least one of: size, color, or brightness.

17. The computer program product of claim 13, wherein the program code portions are further configured, when said program product is run on a computer or network device, to determine the visual complexity level by determining the visual complexity level based at least further in part on output provided by the gaze tracker.

18. The computer program product of claim 13, wherein the display defines a pass-through display.

* * * * *